(12) United States Patent
Kostrun et al.

(10) Patent No.: US 10,354,503 B1
(45) Date of Patent: Jul. 16, 2019

(54) METHODS AND DEVICES FOR ACTIVITY MONITORING IN SPACES UTILIZING AN ARRAY OF MOTION SENSORS

(71) Applicants: Marijan Kostrun, Rowley, MA (US); Richard Garner, Arlington, MA (US); Anant Aggarwal, Waltham, MA (US)

(72) Inventors: Marijan Kostrun, Rowley, MA (US); Richard Garner, Arlington, MA (US); Anant Aggarwal, Waltham, MA (US)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 15/875,090

(22) Filed: Jan. 19, 2018

(51) Int. Cl.
| G08B 13/19 | (2006.01) |
| G01S 13/56 | (2006.01) |
| F21V 23/04 | (2006.01) |
| G01J 5/00 | (2006.01) |
| H05B 37/02 | (2006.01) |
| G08B 13/189 | (2006.01) |
| G08B 13/194 | (2006.01) |

(52) U.S. Cl.
CPC .......... *G08B 13/19* (2013.01); *F21V 23/0478* (2013.01); *G01J 5/0025* (2013.01); *G01S 13/56* (2013.01); *G08B 13/189* (2013.01); *G08B 13/1895* (2013.01); *G08B 13/194* (2013.01); *H05B 37/0227* (2013.01)

(58) Field of Classification Search
CPC .... G08B 13/19; G08B 13/189; G08B 13/195; G08B 13/1895; H05B 37/0227; G01J 5/0025; F21V 23/0478; G01S 13/56
See application file for complete search history.

(56) References Cited

U.S. PATENT DOCUMENTS

| 6,625,553 | B1 * | 9/2003 | Modgil | B60R 25/04 307/10.7 |
| 9,613,524 | B1 | 4/2017 | Lamb et al. | |
| 2002/0111756 | A1 * | 8/2002 | Modgil | B60R 25/04 702/63 |
| 2008/0157964 | A1 | 7/2008 | Eskildsen et al. | |
| 2013/0214166 | A1 * | 8/2013 | Barlow | G01S 5/16 250/342 |
| 2015/0130933 | A1 * | 5/2015 | Breuer | H04N 5/33 348/143 |
| 2016/0202678 | A1 * | 7/2016 | Aggarwal | G05B 15/02 700/275 |

FOREIGN PATENT DOCUMENTS

WO 2016109335 A1 7/2016

* cited by examiner

*Primary Examiner* — Michael C Bryant
(74) *Attorney, Agent, or Firm* — Yutian Ling (57) ABSTRACT

Aspects of the present disclosure include arrays of motion sensors that may be used to monitor a space to determine occupancy characteristics of the space, such as whether or not the space is occupied and the number of people located within the space. The array of motion sensors may be operatively connected to one or more building system components, such as lighting and HVAC equipment and can be used for adjusting an operating condition of the building system component based on whether a space is occupied.

11 Claims, 5 Drawing Sheets

METHODS AND DEVICES FOR ACTIVITY MONITORING IN SPACES UTILIZING AN ARRAY OF MOTION SENSORS

FIELD OF THE DISCLOSURE

The present disclosure generally relates to the field of methods and devices for activity monitoring in spaces. In particular, the present disclosure is directed to methods and devices for activity monitoring in spaces utilizing an array of motion sensors.

BACKGROUND

Knowledge regarding the occupancy of a particular region or space can be useful in a variety of applications. For instance, knowledge of occupancy within a building can be used to improve the energy efficiency by the automation of lighting and heating, ventilation and/or air conditioning (HVAC), and can be used in emergency situations to improve search and rescue efforts of first responders by providing information regarding the location of occupants.

Passive infrared (PIR) motion sensors are often used for occupancy sensing. For example, PIR sensors are often used in combination with wall switches to turn on the lights in a room when a person enters, and turn the lights off at a fixed preset time duration after motion in the room is no longer detected. This type of system, however, can result in the lights in a room automatically turning off after a predetermined period of time after motion is last sensed, even if one or more people are still in the room.

SUMMARY OF THE DISCLOSURE

In one implementation, the present disclosure is directed to a method of determining an occupancy characteristic of a space with an array of motion sensors, each of the motion sensors having a field of view (FOV) and the space having a gate for entering and exiting the space, the array of motion sensors including a gate sensor, in which the gate is in the FOV of the gate sensor. The method includes detecting, with the array, the presence of a person in the space when at least one of the motion sensors becomes active, and determining the space is empty when all of the motion sensors become inactive and the gate sensor was the last one of the motion sensors to be active.

In some embodiments, the method further includes determining if a value of a timer meets or exceeds a threshold value, and determining the space is empty in response to determining that all of the motion sensors are inactive, the gate sensor was the last one of the motion sensors to be active, and the value of the timer meets or exceeds the threshold value. In some embodiments, the method further includes, in response to determining the space is empty, sending an unoccupied signal to one or more building system components. In some embodiments, the method further includes determining whether one of the motion sensors adjacent the gate sensor was active prior to the gate sensor being active, and determining that a single person left the space in response to determining that one of the motion sensors adjacent the gate sensor was active prior to the gate sensor being active. In some embodiments, the method further includes determining whether a duration of time the gate sensor was active prior to all of the motion sensors becoming inactive is greater than a predetermined time duration, and determining that a single person left the space in response to determining that the duration of time the gate sensor was active prior to all of the motion sensors becoming inactive is greater than the predetermined time duration. In some embodiments, the predetermined time duration is an amount of time to walk across a portion of the space encompassed by the gate sensor FOV. In some embodiments, the method further includes determining a first amount of time that the gate sensor was active prior to the space becoming empty, determining a second amount of time associated with one person walking across the gate sensor FOV, and determining, based on the first amount of time and a second amount of time, a number of people that have left the space.

In another implementation, the present disclosure is directed to a method of determining an occupancy characteristic of a space with an array of motion sensors operatively connected to a processor. The method includes receiving sensor data from the array of motion sensors, characterizing, by the processor, the sensor data as components of state vectors, and determining, by the processor, occupancy characteristics of the space by analyzing the state vectors.

In some embodiments, the method further includes applying, by the processor, a compaction process to disregard ones of the state vectors associated with random motion within the space. In some embodiments, the compaction process includes disregarding, by the processor, state vectors in which all of the motion sensors are inactive for a time duration that is less than a threshold value. In some embodiments, the method further includes defining, by the processor, the threshold value as a duration of time for a person to walk across a field of view (FOV) of one of the motion sensors. In some embodiments, the method further includes determining, by the processor, the threshold value by identifying three consecutive state vectors, the first and third of the three consecutive state vectors each containing only one active motion sensor and second state vector containing no active motion sensors, in which the active motion sensors in the first and third state vectors are immediately adjacent in space. In some embodiments, the space includes a gate for entering and exiting the space, and one of the motion sensors is a gate sensor having a field of view that includes the gate, the method further includes identifying, by the processor, the gate sensor by analyzing consecutive state vectors. In some embodiments, identifying the gate sensor includes identifying, by the processor, a state vector of inactivity preceded and succeeded by a state vector with at least one active motion sensor. In some embodiments, identifying the state vector of inactivity includes determining, by the processor, whether the state vector of inactivity has a duration that is greater than a threshold value. In some embodiments, determining occupancy characteristics of the space by analyzing the state vectors includes calculating, by the processor, feature vectors from the sensor data, in which the feature vectors include a sum of the number of active sensors and spatial correlation between consecutive state vectors, and using, by the processor, a classifier to interpret the feature vectors based on a learning set of feature vectors.

In yet another implementation, the present disclosure is directed to a device. The device includes a plurality of motion sensors, in which at least one of the plurality of motion sensors is configured to be a gate sensor having a field of view that, when the device is installed in a space, includes a gate for entering and exiting the space, and a processor configured to detect, with the plurality of motion sensors, the presence of a person when one of the motion sensors becomes active, and determine that a space monitored by the device is empty when all of the motion sensors become inactive and the gate sensor was the last one of the motion sensors to be active.

In some embodiments, the processor is further configured to characterize sensor data from the plurality of sensors as state vectors having components, each of the components corresponding to one of the motion sensors. In some embodiments, the processor is further configured to identify the gate sensor from the plurality of sensors by analyzing the state vectors. In some embodiments, the processor is further configured to determine when a person has left the space by identifying a state vector in which only the gate sensor was active followed by a duration of time where no sensor was active.

BRIEF DESCRIPTION OF THE DRAWINGS

For the purpose of illustrating the disclosure, the drawings show aspects of one or more embodiments of the disclosure. However, it should be understood that the present disclosure is not limited to the precise arrangements and instrumentalities shown in the drawings.

DETAILED DESCRIPTION

Aspects of the present disclosure include arrays of motion sensors that may be used to monitor a space to determine occupancy characteristics of the space, such as whether or not the space is occupied and the number of people located within the space. The array of motion sensors may be operatively connected to one or more building system components, such as lighting and HVAC equipment, and can be used for adjusting an operating condition of the building system components based on whether a space is occupied.

One example of a motion sensor is a passive infrared (PIR) motion sensor, which can detect movement of any object in its field-of-view (FOV) that is not in thermal equilibrium with its surroundings, such as movement of a person within the FOV. In some examples, PIR sensors have a property that a duration of active or "on" state is proportional to the thermal stimulus, that is, they turn "on" at the moment a detected thermal signal exceeds a running mean of detected thermal signals by some predefined threshold and then stay on until the running mean catches-up with the signal. In other words, over time the running mean and the thermal signal become separated by an amount below a threshold, such that after a period of time the PIR sensor becomes inactive.

Figure 1:
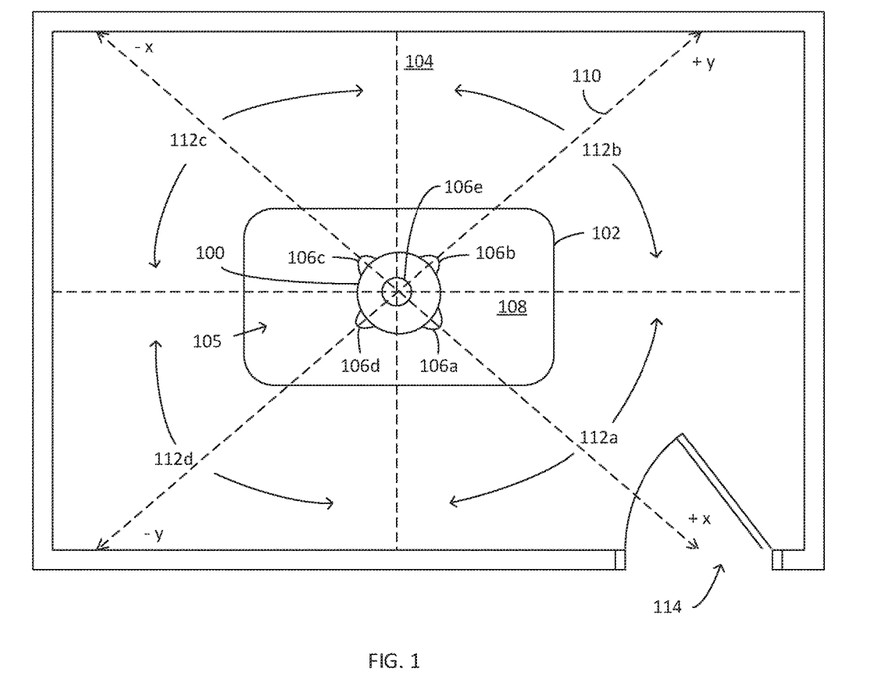
FIG. 1 is a diagram of one example of a device that includes an array of motion sensors located in a space for monitoring the occupancy of the space in accordance with various embodiments.

FIG. 1 shows one example of a device 100 for detecting the presence of people within the space that can be com-
municatively coupled to one or more building system components (FIG. 3) such as lighting within the space for turning the lights on and off when the space is occupied or empty, respectively. In the illustrated example, device 100 is located on a desk 102 within a monitored space 104. In another example, device 100 may also or alternatively be located on the wall or ceiling of the space. Device 100 includes a motion sensor array 105, which includes a plurality of motion sensors 106, specifically, 106a-106e, for monitoring the occupancy of space 104. In the illustrated example, each of the motion sensors 106 has a FOV of approximately 90 degrees, with motion sensors 106a-106d pointed in orthogonal horizontal directions substantially parallel to a surface 108 of desk 102, such that the FOV of sensors 106a-106d collectively provide a 360 degree view of space. Referring to coordinate system 110, motion sensors 106a, 106b, 106c, and 106d are pointed in horizontal directions +X, +Y, -X, and -Y, respectively. Motion sensor 106e is pointed in a vertical direction +Z such that space 104 is divided into five zones 112, namely, zones 112a-112e (only horizontal zones 112a-112d labeled), where each of zones 112 is monitored by only a corresponding one of motion sensors 106 and there is minimal overlap between the zones. In other examples, a given zone of a monitored space may be monitored by more than one sensor.

Space 104 includes one gate 114, such as a door or other opening for entering and exiting the space. In the illustrated example, gate 114 is in the FOV of only one of motion sensors 106 of device 100, specifically, motion sensor 106a. As described more below, motion sensor 106a can, therefore, be referred to in this example as the gate sensor. As described more below, the output signals from motion sensors 106 may be analyzed to determine a variety of occupancy characteristics of space 104, such as whether space 104 is occupied and a number of people located in the space at a given moment in time. In some examples, the sensor data of motion sensors 106 can be characterized as state vectors, where each vector has as many components as there are motion sensors. The vectors may then be processed to determine space occupancy state information. In some examples, identification of one or more motion sensors as gate sensors and comparison of the sensor data from the gate sensor(s) to other sensors monitoring a space can be used to identify the movement of people within the space, and movement of people into and out of the space, which can be used to determine when the space is occupied and to count the number of people within the space.

Figure 2:
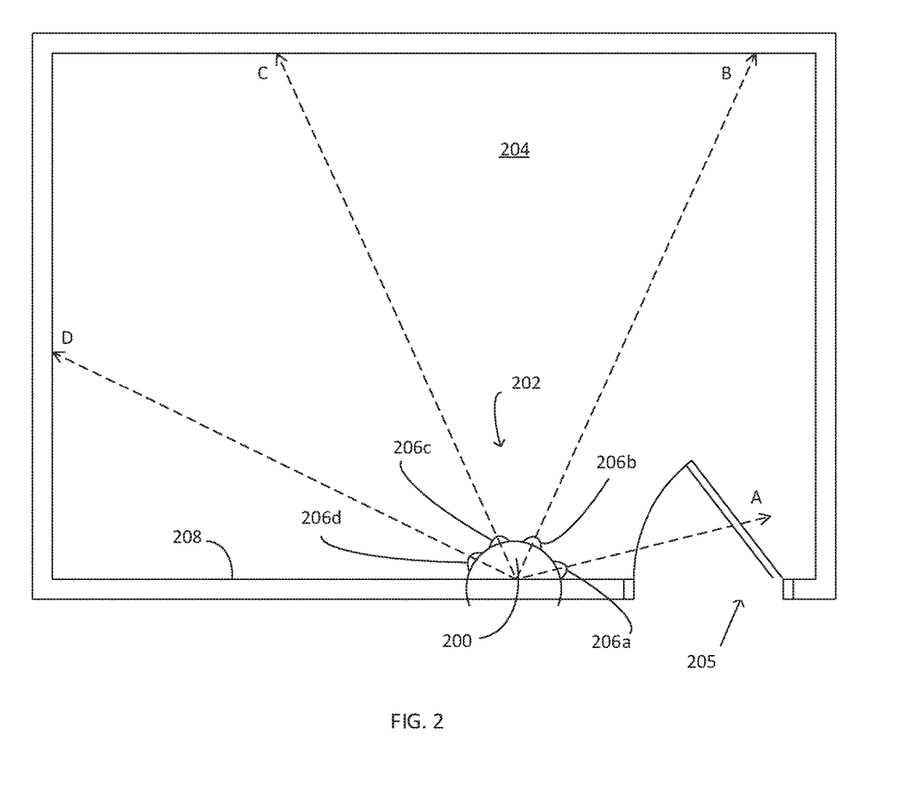
FIG. 2 is a diagram of another example of a device that includes an array of motion sensors located in a space for monitoring the occupancy of the space in accordance with various embodiments.

FIG. 2 shows another example of a device 200 that includes a motion sensor array 202 which includes a plurality of motion sensors 206, specifically sensors 206a-206d, for monitoring the occupancy of space 204. As with space 104, space 204 has a gate 205. Unlike device 100, which has five sensors 106a-106e and is located on a horizontal surface (i.e., horizontal surface 108 of desk 102), device 200 has four sensors 206 and is mounted to a vertical wall 208 of space 204. Each of motion sensors 206 has a FOV, with arrows A-D conceptually illustrating corresponding respective centers of motion sensor FOVs. As with device 100, device 200 is oriented such that the FOVs of motion sensors 206 divide space 204 into zones, and such that the FOVs of the motion sensors have minimal overlap, which can facilitate detecting the movement of a person from one motion sensor zone to another. Device 200 is also arranged such that gate 205 is located within the FOV of only one of motion sensors 206, here motion sensor 206a, which may also be referred to as the gate sensor because it is monitoring gate 205, such that a person entering or leaving space 204 can be detected by motion sensor 206a.

In the examples illustrated in FIGS. 1 and 2, each device 100, 200, includes an array of motion sensors 106, 206, respectively, that is configured and dimensioned so that FOVs of the motion sensors collectively encompass substantially all of a space, or at least substantially all of a portion of a space where occupants will be located. For example, the sensor FOVs in the examples shown in FIGS. 1 and 2 collectively encompass substantially all of a horizontal plane located in the space and the device and/or sensors can be positioned so that the plane includes a portion of the space where occupants will be located. A variety of other configurations may also be used. For example, a plurality of devices, each of which may be the same as or similar to devices 100, 200, may be used in a single space rather than just one device as shown in FIGS. 1 and 2, with each of the multiple devices having one or more motion sensors. In some examples, more than four motion sensors can be used to collectively cover a space, and the FOV of the four or more sensors can have minimal overlap, or can have a substantial amount of overlap, for example, up to 100% overlap. In some examples, the FOVs of a motion sensor array may not encompass an entire horizontal plane in a space. For example, a motion sensor device may include one gate sensor and at least one additional sensor having a FOV that is adjacent the gate sensor FOV. For example, in the case of a device located some distance from a perimeter of a space, such as device 100, such a device may only include three sensors. For example, device 100 may be modified to omit sensors 106c and 106e such that it includes gate sensor 106a and adjacent sensors 106b, 106d. For a device located along the perimeter of a space, such as device 200 (FIG. 2), device 200 may be modified to omit motion sensors 206c and 206206d and only include one sensor (206b) in addition to the gate sensor 206a. More generally, a device may include at least one gate sensor and one or more additional sensors detect movement of a person to other areas of a monitored space outside of an area of the space encompassed by the gate sensor FOV.

In the examples illustrated in FIGS. 1 and 2, motion sensors 106, 206 are designed to become active when the presence of a person is detected within the FOV of a sensor. In some examples, motion sensors 106, 206 are configured to remain active for a duration that is a function of a magnitude of stimulus, e.g., thermal stimulus detected by the sensor. In some examples, one or more of motion sensors 106, 206, are PIR sensors. Non-limiting examples of PIR sensors that may be used in some examples include sensors provided by Excelitas Technologies. In another example one or more of sensors 106, 206 may be an IR array, e.g., an array of IR pixels, e.g., a 32×32 array, and post processing of temperature data from the IR array may be used to mimic the behavior of a PIR sensor.

Figure 3:
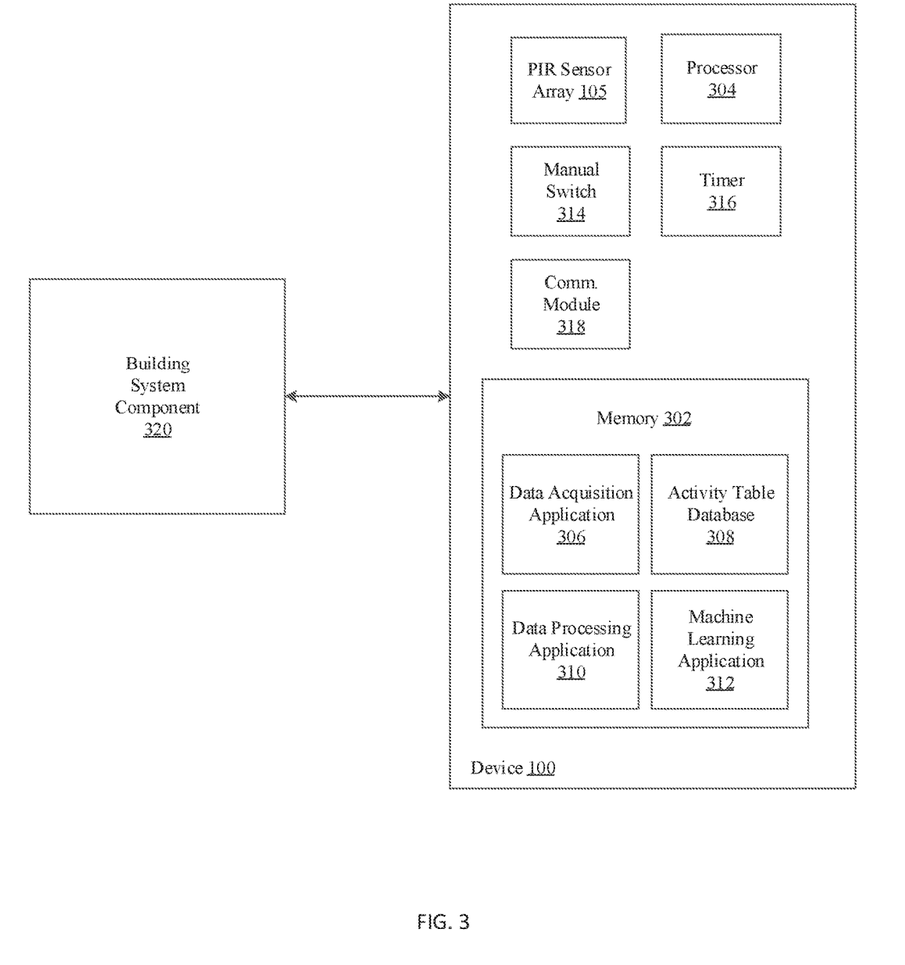
FIG. 3 is a functional block diagram of the device of FIG. 1 in accordance with various embodiments.

FIG. 3 is a functional block diagram of device 100. Device 200 may have a similar configuration. In the illustrated example, device 100 may include motion sensor array 105 (FIG. 1) that are each operatively connected to a memory 302 for storing raw data from the sensor array. Memory 302 can be of any suitable type (e.g., RAM and/or ROM, or other suitable memory) and size, and in some cases may be implemented with volatile memory, non-volatile memory, or a combination thereof. Memory 302 may be utilized, for example, for processor workspace and/or to store applications, sensor data, etc., on a temporary or permanent basis. Memory 302 can include one or more modules stored therein that can be accessed and executed, for example, by processor(s) 304.

Memory 302 also may include one or more applications stored therein. For example, in some cases, memory 302 may include a data acquisition application 306 for receiving sensor data from motion sensor array 105 and storing the data in an activity table database 308, a data processing application 310 for processing the motion sensor data, and a machine learning application 312 for applying one or more machine learning algorithms for analyzing the motion sensor data.

Device 100 may also include a manual switch 314, such as a dual in-line package (DIP) switch, which can be used to manually define an orientation of one or more of motion sensors 106a-106e. For example, the manual switch 314 may be used to define one or more of the sensors as a gate sensor to indicate that an access point to a space being monitored by device 100 is within a FOV of the motion sensor. Device 100 may also include a timer 316, such as a 32-bit millisecond timer that, as described below, can be used to determine an elapsed time associated with a motion sensor array state vector and an elapsed time from when activity was detected within a space.

Device 100 may also include a communication module 318, in accordance with some embodiments. Communication module 318 may be configured, for example, to aid in communicatively coupling device 100 with one or more building system components 320 and/or a corresponding communication network. Communication module 318 can be configured, for example, to execute any suitable wireless communication protocol that allows for data/information to be passed wirelessly. Note that each of device 100, and any building system component can be associated with a unique ID (e.g., IP address, MAC address, cell number, or other such identifier) that can be used to assist the communicative coupling there between, in accordance with some embodiments. Some example suitable wireless communication methods that can be implemented by communication module 318 of device 100 may include: radio frequency (RF) communications (e.g., Wi-Fi®; Bluetooth®; near field communication or NFC); IEEE 802.11 wireless local area network (WLAN) communications; infrared (IR) communications; cellular data service communications; satellite Internet access communications; custom/proprietary communication protocol; and/or a combination of any one or more thereof. In some embodiments, device 100 may be capable of utilizing multiple methods of wireless communication. In some such cases, the multiple wireless communication techniques may be permitted to overlap in function/operation, while in some other cases they may be exclusive of one another. In some cases a wired connection (e.g., USB, Ethernet, FireWire, or other suitable wired interfacing) may also or alternatively be provided between device 100 and one or more building system components.

In some instances, device 100 may be configured to be directly communicatively coupled with a building system component 320. For example, device 100 can be used as a switch for turning one or more lights on and off. In some other cases, device 100 and corresponding building system components optionally may be indirectly communicatively coupled with one another, for example, by an intervening or otherwise intermediate network (not illustrated) for facilitating the transfer of data between the device and building system component. Any suitable communications network may be used, and in some example cases may be a public and/or private network, such as a private local area network (LAN) operatively coupled to a wide area network (WAN)

such as the Internet. In some instances, a network may include a wireless local area network (WLAN) (e.g., Wi-Fi® wireless data communication technologies). In some instances, a network may include Bluetooth® wireless data communication technologies. In some cases, a network may include supporting infrastructure and/or functionalities such as a server and a service provider.

Data Acquisition

As discussed above, motion sensor arrays made in accordance with the present disclosure, such as array 105 (FIG. 1), may be operatively connected to memory 302 and processor 304 and the processor can be configured to receive and analyze the motion sensor readings to determine whether a space monitored by the array, such as space 104, is occupied. For example, the output of each motion sensor 106a-106e can be monitored as a function of time, and the value of each motion sensor can be characterized as a component of a state vector $A_i$, where vector $A_i$ has as many components as there are motion sensors 106. As described more below, state vector $A_i$ may be processed and analyzed in a variety of ways to determine occupancy characteristics of a monitored space. Example motion sensor data processing algorithms are discuss herein in connection with device 100 (FIG. 1), however, it will be appreciated by a person having ordinary skill in the art that the sensor data analysis processes disclosed herein may be applied to other configurations of motion sensor arrays having any number and arrangement of motion sensors.

In one example, the state vectors may be saved in activity table database 308 (FIG. 3) for analysis. In one example, to reduce data that will not be useful for determining occupancy characteristics for space 104, only vectors $A_i$ associated with a change in a motion sensor 106 reading may be saved. For example, processor 304 may add a vector $A_i$ to activity table database 308 if the vector differs from a last-saved vector by at least one motion state such that any two consecutive vectors $A_i,A_{i+1}$ differ in at least one motion state. A duration of time associated with vector $A_i$ may also be saved. If vector $A_i$ and $A_{i+1}$ started at times $t_i$ and $t_{i+1}$, respectively, timer 316 may be reset when each new vector A is saved, and an elapsed time (as opposed to absolute time) may be associated with vector $A_i$, e.g., a duration of time $t_{i+1}$. Activity table database 308 may therefore include rows of motion sensor state vectors and associated durations of time as follows: $A_i$, $t_{i+1}$ which provides a table of motion sensor state vectors and the length of time associated with the vector which can indicate a length of time array 105 of motion sensors 106 were in a given state.

Data acquisition application 306 may include a compaction algorithm to eliminate data associated with short periods of inactivity that can be attributed to random motion of one or more people within a zone 112, such that the activity table is more likely to include only motion sensor state vectors associated with sensing a person entering one of the zones. In one example, a time duration $T_{compact}$ can be defined as a typical duration of time associated with a person walking from one zone 112 to another. $T_{compact}$, therefore, can be a function of a size and/or configuration of a space, such as space 104 and a typical speed of occupants that use the space.

In one example, a compaction process may include an evaluation of three consecutive motion sensor state vectors and associated time durations as shown in Table 1:

TABLE 1

| Vector | Duration of Time |
|---|---|
| $A_{i-1}$ | $t_i$ |
| $A_i = 0$ | $t_{i+1}$ |
| $A_{i+1}$ | $t_{i+2}$ |

Where $A_i=0$ indicates all motion sensors 106 in array 105 are inactive, meaning they are outputting zero. A compaction process may remove zero state $A_i=0$ from activity table if it's duration is less than $T_{compact}$:

$$t_{i+1} < T_{compact} \qquad \text{Eq. (1)}$$

If $A_i=0$ is removed, the duration of $A_{i+1}$ in the activity table can become a modified $t_{i+1}$ equal to $t_{i+2}$ plus $t_{i+1}$, the duration of $A_i=0$.

In one example, processor 304 may be configured to determine and/or periodically or continually adjust $T_{compact}$. In one example processor 304 can determine $T_{compact}$ by considering a subset of A vectors associated with a single person moving between zones. In one example, this can be modeled by considering three consecutive vectors and associated time durations as shown in Table 2.

TABLE 2

| Vector | Duration of Time |
|---|---|
| $A_{i-1}$ | $t_i$ |
| $A_i = 0$ | $t_{i+1}$ |
| $A_{i+1}$ | $t_{i+2}$ | where $A_{i-1}$ and $A_{i+1}$ each include only one active motion sensor 106, and where the active motion sensor in $A_{i-1}$ and $A_{i+1}$ are adjacent in space 104. This may occur when a single person enters one of zones 112, such as zone 112a, thereby causing the motion sensor 106a to become active and output a value of 1, and then the person continues to move to an adjacent one of zones 112, in this example, zone 112b or 112d, and cause the sensor 106 associated with that zone 112b or 112d to become active. Processor can be configured to identify a single person moving between zones 112 when the following two conditions of equations (2) and (3) are met:

$$\Sigma(A_{i-1}) = \Sigma(A_{i+1}) = 1; \text{ and} \qquad \text{Eq. (2)}$$

$$A_{i-1}^T * N * A_{i+1} = 1, \qquad \text{Eq. (3)}$$

in which:
$A_{i-1}^T$ is the transpose of $A_{i-1}$ and
N is a neighborhood matrix which entry (a,b) equals 1 if sensors a and b are neighbors or the same sensor (a=b) and otherwise 0. Table 3 illustrates an example neighborhood matrix N for device 100:

TABLE 3

| | PIR 106a | PIR 106b | PIR 106c | PIR 106d | PIR 106e |
|---|---|---|---|---|---|
| PIR 106a | 1 | 1 | 0 | 1 | 1 |
| PIR 106b | 1 | 1 | 1 | 0 | 1 |
| PIR 106c | 0 | 1 | 1 | 1 | 1 |
| PIR 106d | 1 | 0 | 1 | 1 | 1 |
| PIR 106e | 1 | 1 | 1 | 1 | 1 |

Note that in the example shown in FIG. 1, the fifth sensor 106e may not be included in the analysis because device 100 is located on a desk with sensor 106e pointing up. In another example, where device 100 is located on the ceiling, data from sensor 106e may be included in the analysis. Processor 304 can collect the motion sensor state vectors that meet the requirements of equations 2 and 3, apply the compaction process discussed above to remove $A_i=0$ and associate vector $A_{i+1}$ with a modified duration of $t_{i+1}$ equal to the duration of $t_{i+1}$ associated with $A_i=0$ plus time duration $t_{i+2}$ from Table 2. Processor 304 can then evaluate the distribution of modified time durations $t_{i+1}$ associated with vectors $A_{i+1}$. The collected time distributions may eventually include a superposition of two distributions—a uniform distribution associated with random motion of occupants, and another distribution with a maxima or peak corresponding to a longer time duration associated with a single person moving between two adjacent zones. Processor 304 may be configured to use statistical processing techniques to, for example, determine a mean value associated with the local maxima and then set $T_{compact}$ equal to the determined maxima plus half of the width of the maxima.

Data Processing

As discussed above, prior art implementations of motion sensors and timers include resetting a timer of a predefined duration to zero when a motion sensor senses the presence of a person in a space and becomes active, e.g., the output of the sensor changes from zero to one. A drawback of such an approach is people may remain in the space for a longer duration of time than the duration of the timer such that a building system component 320 controlled by the sensor may transition to an unoccupied state, for example, lights in the space may turn off, or the temperature in the space may be decreased, etc., even though the space is still occupied. Motion sensor arrays made in accordance with the present disclosure, such as motion sensor arrays 105 (FIG. 1) and 202 (FIG. 2) may be used to overcome the shortcoming of prior art motion sensor devices. In one example, a motion sensor array such as motion sensor array 105 may be installed in a space, such as space 104, and the motion sensor 106 whose FOV includes gate 114 can be identified as the gate sensor. After identifying the gate sensor, and with knowledge of the spatial relationship of the gate sensor, in the FIG. 1 example motion sensor 106a, to the other motion sensors 106 in array 105, the device may be used to determine when space 104 is unoccupied when both (1) timer 316 (FIG. 3) reaches a predetermined time duration, (2) all motion sensors 106 read zero, and (3) the last motion state vector where activity was detected involved only the gate sensor.

Figure 4:
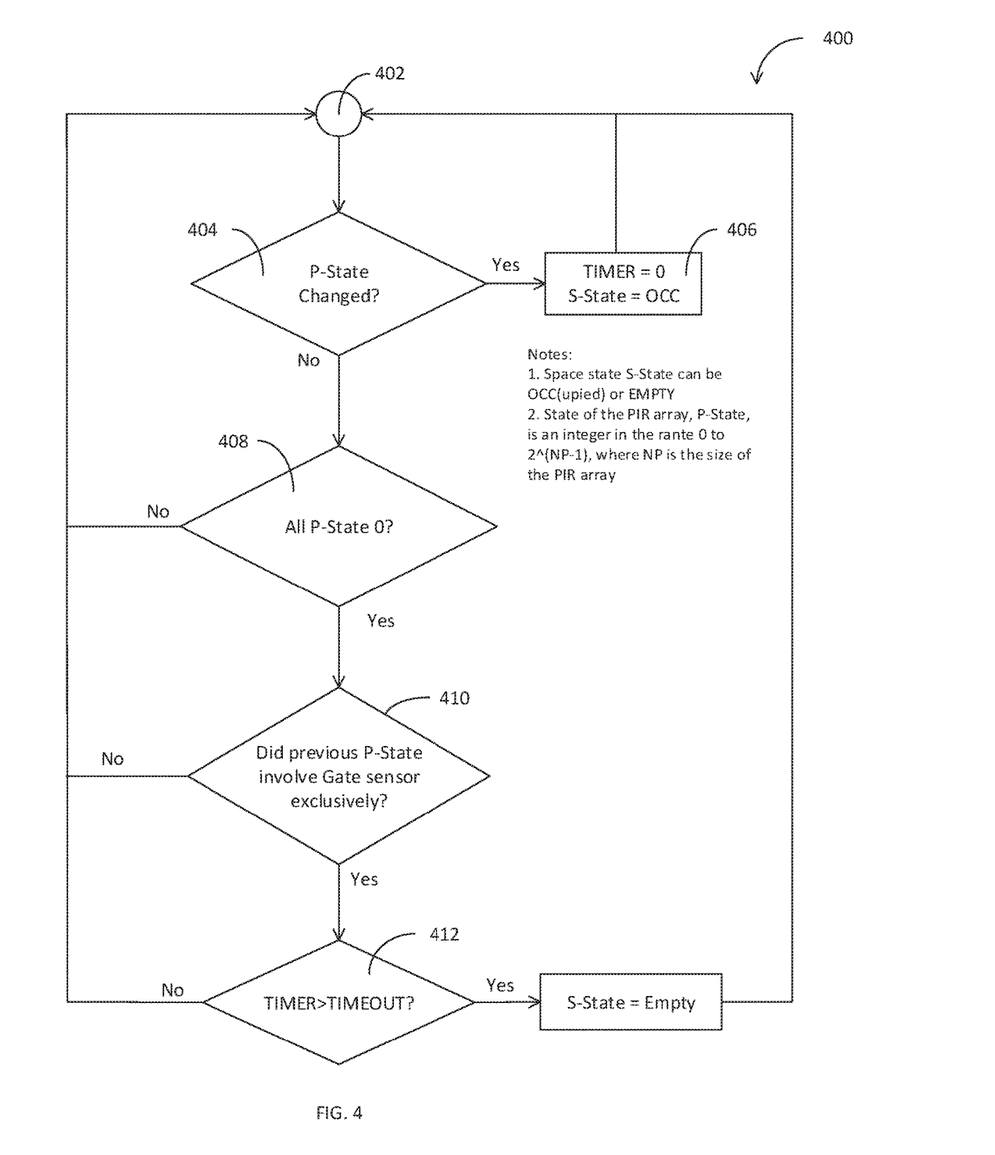
FIG. 4 is a flowchart of a process for determining when a space becomes unoccupied by analyzing data from an array of motion sensors in accordance with various embodiments.

Referring to FIG. 4, and also to FIGS. 1 and 3, FIG. 4 illustrates an example process 400 for determining when a space, such as space 104, becomes unoccupied, by utilizing a device that includes an array of motion sensors, such as device 100 or device 202. Process 400 may begin at block 402 and then proceed to block 404 in which a processor, such as processor 304 (FIG. 3), may determine if a state of any of motion sensors 106 has changed (abbreviated as P-State in FIG. 4), thereby indicating the presence of one or more people has been detected within space 104. If yes, at block 406, timer 316 can be reset to zero, and the process may return to block 402. If, at block 404, there has been no change in the output of any motion sensor 106, at block 408, processor 304 may determine if the output of all of motion sensors 106 is zero, indicating no activity within space 104. If no, then activity has been detected recently and the process can return to block 402. If the decision at block 408 is yes, indicating no activity has been sensed for some period of time and space 104 may be empty, then at block 410, processor 304 may determine if the last instance in time where a motion sensor sensed the presence of a person (e.g., when the output of one of motion sensors 106 was 1), only the gate sensor (e.g., motion sensor 106a) was active. Such a reading may indicate the last person in space 104 has left because none of the other motion sensors 106 were detecting activity and after sensor 106a detected activity, there was a period in which no sensors detected activity. If the decision at block 410 is no, the process can return to block 402. Thus, even if all of motion sensors 106 are reading zero for a long duration of time, processor 304 may still consider space 104 as occupied unless the condition in block 410 is met. This can allow a building system component, such as lights in space 104 to remain on when occupants in the space 104 have remained stationary for a long period of time, such as during a meeting. If the condition in block 410 is met, process 400 can continue to block 412 to determine if the output of timer 316 is greater than a predefined timeout duration. If yes, then processor 304 can determine the state of occupancy of space 104 (abbreviated in FIG. 4 as S-State) is empty and send an unoccupied signal to one or more building system components to, for example, turn the lights off in space 104. The systems and methods disclosed herein may be extended to spaces with more than one gate. In such cases, there may be more than one device, each device having one or more motion sensors. A central controller may collect and analyze data from each device in order to collectively monitor the activity in the space and entry and exit from each gate.

Prior to implementing process 400, the gate sensor of a motion sensor array may be determined. As discussed above, a gate sensor is a motion sensor whose FOV includes the means of ingress to and egress from a space, such as a door in a conference room. In the example illustrated in FIG. 1, motion sensor 106a is the gate sensor because motion sensor array 105 is positioned such that gate 114 is within the FOV of motion sensor 106a, the FOV being illustrated in FIG. 1 as zone 112a. In one example, Device 100 may include mechanical switch 314, such as a DIP switch. During installation of device 100, mechanical switch 314 may be used to identify the motion sensor 106 that is the gate sensor. The switch setting can be saved in memory 302 for use by applications 306, 310, and 312.

If the gate sensor is not manually set, processor 304 may be configured to analyze sensor data from motion sensors 106 to identify the gate sensor. In one example, processor 304 can look at three consecutive motion sensor state vectors A having associated durations as shown in Table 4:

TABLE 4

| Vector | Duration of Time |
|---|---|
| $A_{i-1}$ | $t_i$ |
| $A_i = 0$ | $t_{i+1}$ |
| $A_{i+1}$ | $t_{i+2}$ |

In one example, a motion sensor can be assumed to be the gate sensor if it is the only active sensor prior to and after a relatively long period of inactivity, which can be referred to as $T_{gate}$. For example, when all occupants leave space 104, the gate sensor, here motion sensor 106a, would be the last sensor to detect the presence of a person because it is the last zone 112 the person would need to walk through to leave the room. Space 104 may then be empty for a relatively long period of time, e.g., minutes or hours, until someone entered the room again for the next meeting or the next work day. When one or more people again enter space 104, motion sensor 106*a* would be the first sensor to sense the presence of a person as the first person enters space 104.

In one example, $T_{gate}$ may be determined when the following three conditions are met:

$$\Sigma(A_{i-1})=\Sigma(A_{i+1})=1 \quad \text{Eq. (4)}$$

$$t_{i+1}>T_{gate}; \text{ and} \quad \text{Eq. (5)}$$

$$\Sigma(A_{i-1}*A_{i+1})=1 \quad \text{Eq. (6)}$$

As will be appreciated, the conditions defined by equations 4-6 would be satisfied when only one motion sensor 106 is active in vectors $A_{i-1}$ and $A_{i+1}$ and it is the same sensor.

The value of $T_{gate}$ can be a function of what space 104 is typically used for, and in some examples, can be as long as a few hours. Processor 304 may then define the gate sensor as the single sensor that was active in both $A_{i-1}$ and $A_{i+1}$ when a sufficiently long $T_{gate}$ is applied.

In another example, processor 304 may consider more motion sensor state vectors than as allowed by equations 4-6 as follows:

$$\Sigma(A_{i-1}*A_{i+1}) \geq 1 \quad \text{Eq. (7)}$$

Applying equation 7, processor 304 would evaluate not only vectors $A_{i-1}$ and $A_{i+1}$ in which the same sensor and only that sensor is active before and after a period where no activity is detected ($A_i=0$) but also motion vectors in which any sensor is active before and after a period of inactivity. Processor 304 may then determine the gate sensor is the sensor that is most active in the group of vectors that satisfy equation 7.

After the gate motion sensor is manually set or determined by processor 304 as described above, an identification number associated with the gate sensor can be saved to memory 302 for use by processor 304. After processor 304 has determined which motion sensor 106 is the gate sensor, it can immediately begin to apply one or more algorithms that utilize identification of the gate sensor for determining occupancy, such as process 400 (FIG. 4).

Any of a variety of algorithms may be employed that compare motion gate sensor data to the data of other motion sensors in an array to, for example, determine when a space is empty, and/or to count the number of people entering or leaving a space. In one example, processor 304 may determine when a single person has left space 104 by evaluating two consecutive motion array state vectors $A_{i-2}$, $A_{i-1}$ prior to a vector of inactivity $A_i=0$ and determine a single person has left space 104 if (1) $A_{i-1}$ reflects only the gate sensor is active, (2) $A_{i-2}$ reflects only a sensor immediately adjacent the gate sensor is active, and (3) the duration the gate sensor was active is equal to or greater than an expected minimum time for a person to walk through the gate sensor field of view and exit space 104. For example, processor 304 may consider three consecutive motion sensor array state vectors as shown in Table 5:

TABLE 5

| Vector | Duration of Time |
|---|---|
| $A_{i-2} \neq 0$ | $t_{i-1}$ |
| $A_{i-1} = G$ | $t_i$ |
| $A_i = 0$ | $t_{i+1}$ |

(Note: $A_{i-1} = G$ indicates that only the gate sensor is active; $A_i = 0$ indicates no sensor is active)

Processor 304 may determine a single person has left space 104 when the following three conditions are met:

$$\Sigma(A_{i-2})=1 \quad \text{Eq. (8)}$$

$$A_{i-1}^T * N * A_{i-2} = 1; \quad \text{and Eq. (9)}$$

$$t_i > T_{move} \quad \text{Eq. (10)}$$

in which:

$A_{i-1}^T$ is the transpose of $A_{i-1}$

N is a neighborhood matrix that equals 1 when motion sensors are neighbors or the same sensor and otherwise 0 (Table 3 for the example illustrated in FIG. 1); and $T_{move}$ is an expected minimum time for a person to walk through the gate sensor field of view and exit the space 104. $T_{move}$ can be assumed based on a size of the gate sensor FOV and a typical walking speed, or a distribution of time durations $t_i$ may be determined and compared to durations of active times of other sensors.

As will be appreciated, the conditions set forth in equations 8-10 are satisfied when in the i–2 state, the nearest neighbor to the gate sensor was active. Thus, equations 8-10 model a single person moving from a zone 112 adjacent the gate sensor zone, through the gate sensor zone, and then exiting.

Similarly, three consecutive motion array state vectors $A_{i-3}$, $A_{i-2}$, $A_{i-1}$ prior to a vector of inactivity $A_i=0$ can be evaluated to determine when a single person has left space 104 as follows. Processor 304 may consider four consecutive motion sensor array state vectors as shown in Table 6:

TABLE 6

| Vector | Duration of Time |
|---|---|
| $A_{i-3} \neq 0$ | $t_{i-2}$ |
| $A_{i-2} = 0$ | $t_{i-1}$ |
| $A_{i-1} = G$ | $t_i$ |
| $A_i = 0$ | $t_{i+1}$ |

(Note: $A_{i-3} \neq 0$ indicates at least one sensor is active; $A_{i-1} = G$ indicates that only the gate sensor is active; $A_{i-2}$ and $A_i = 0$ indicates no sensor is active)

Processor 304 may determine a single person has left space 104 when the following four conditions are met:

$$\Sigma(A_{i-3})=1 \quad \text{Eq. (11)}$$

$$A_{i-1}^T * N * A_{i-3} = 1 \quad \text{Eq. (12)}$$

$$t_i > T_{move} \quad \text{Eq. (13)}$$

$$t_{i-1} < T_{move} \quad \text{Eq. (14)}$$

in which:

$A_{i-1}^T$ is the transpose of $A_{i-1}$

N is a neighborhood matrix that equals 1 when motion sensors are neighbors or the same sensor and otherwise 0 (Table 3 for the example illustrated in FIG. 1); and $T_{move}$ an expected minimum time for a person to walk through the gate sensor field of view and exit the space 104. $T_{move}$ may be assumed based on a size of the gate sensor FOV and a typical walking speed, or a distribution of time durations $t_i$ may be determined and compared to durations of active times of other sensors.

As will be appreciated, equations 11-14 are satisfied when in the i–3 state, the nearest neighbor to the gate sensor was active. Thus, equations 11-14 model a single person moving from a zone 112 adjacent the gate sensor zone (in state i–3), through the gate sensor zone (in state i–1), and then exiting. Equations 11-14 also account for brief periods of inactivity (state i–2) prior to a state where only the gate sensor is active by allowing periods of inactivity that are less than $T_{move}$.

The number of state vectors prior to a period of inactivity can be generalized as a number, K, of vectors, in which K=2 in equations 8-10 and K=3 in equations 11-14. In one example, the number of prior state vectors can be increased as the number of motion sensors being used to monitor a space is increased. One example for determining a value for K for a given application is as follows:

$$K \geq \sqrt{S} \qquad \text{Eq. (15)}$$

in which:

S is the total number of motion sensors.

In one example, when more than three state vectors are considered, a compaction process such as the one described above can be applied and then K consecutive motion sensor state vectors can be identified that each involve only one active sensor and that are associated with a single person walking through adjacent zones to reach the gate sensor and exit.

A number of people that have entered or left a space may also be determined by first applying equations such as 8-10 or 11-14 to determine when a space such as space 104 has completely emptied or filled. Processor 304 may then begin to evaluate consecutive motion sensor array state vectors prior to $A_{i-1}=G$ and identify the last state vector $A_{i-K}$ in which the gate sensor was active, such that in the $A_{i-(K-1)}$ motion state vector, the gate sensor is inactive, but in each of motion sensor state vectors $A_{i-K}$ to $A_{i-1}$ the gate sensor is active. The total duration of time for everyone to move through the zone defined by the FOV of the gate sensor (e.g., zone 112a in FIG. 1), can then be determined by adding the durations associated with each of $A_{i-K}$ to $A_{i-1}$, which can be defined as $T_{leave\_all}$. An estimated number of total people that entered or left space 104 can then be determined as follows:

$$C \approx T_{leave\_all} \div T_{leave\_1} \qquad \text{Eq. (16)}$$

$$T_{leave\_all} = \sum_{i-(K-1)}^{i} t \qquad \text{Eq. (17)}$$

in which:

C is the estimated total number of people; and $T_{leave\_1}$ is the duration of time it takes for one person to move through the zone defined by the FOV of the gate sensor, which in one example can be defined above as $T_{move}$ (see above).

Processor 304 may also analyze motion sensor array state vectors to determine periods of time within some predefined period of time, such as during a range of minutes or hours of a day, or days of a week, in which occupants are active with a space, such as space 104. For example, a total duration of time over some predefined period of time during which any motion sensor in an array of motion sensors detects motion can be recorded.

Machine Learning

In another example, processor 304 may be configured to execute one or more machine learning applications 312 to analyze the output of motion sensors 106 to determine a variety of characteristics associated with the occupancy of space 104. Machine learning algorithms disclosed herein may be used as an alternative or in addition to the other techniques disclosed herein for analysis of motion sensor data. In one example, one or more feature vectors may be defined that can be formed from raw motion sensor data and one or more classifiers can be developed that relate the feature vectors to a learning set of the feature vectors for which the answer, e.g., whether a space 104 is occupied or empty, or the number of people in a space 104, is known. Supervised learning may be used, where a learning set may be specified, for example, during commissioning. In addition or as an alternative, unsupervised learning may be used, for example, a learning set may be developed and refined by device 100 after commissioning. For example, device 100 may be commissioned with a learning set, but the device may also be configured to update the learning set after commissioning. Employing unsupervised machine learning can have the advantage of not requiring a deep understanding of the connection between raw sensor data and a desired answer, for example, whether a space 104 is occupied or how many occupants are in a space 104.

In one example, one or more of the following feature vectors may be defined for monitoring the occupancy of a space:

$$M_i = \Sigma(A_i) \qquad \text{Eq. (18)}$$

$$D_i = t_{i+1} \qquad \text{Eq. (19)}$$

$$C1_{i,i+1} = A_i^T * N * A_{i+1} \qquad \text{Eq. (20)}$$

$$C2_{i,i+2} = A_i^T * N * A_{i+2} \qquad \text{Eq. (21)}$$

in which:

$M_i$ is the total mass of the $i^{th}$ state;

$D_i$ is the time duration of the $i^{th}$ state;

$C1_{i,i+1}$ is the correlation of neighbors for adjacent states and N is the neighborhood matrix discussed above (see, e.g., Table 3); and $C2_{i,i+2}$ is a correlation of neighbors for states twice removed.

Equations 18-21 define one example feature space, which is a four-dimensional feature space. $M_i$ may be useful because it is related to a number of occupants in the space. The other three feature vectors are similar to equations discussed above and can be useful because they contain information about the movement, and change in number, of people within the space. C1 and C2 spatial correlations between consecutive and non-consecutive state vectors.

In one example, processor 304 may be configured to execute machine learning application 312, which may calculate the feature vectors of equations 18-21 and determine an answer using a classifier. In one example, a classifier may consider a hypervolume of the feature space in which the sensor data resides, and make an interpretation of the sensor data based on past associations between the hypervolume and possible answers (the learning set of feature vectors). Any of a variety of classifiers known in the art may be used, for example, machine learning application 312 may employ a K-nearest neighbors (KNN) classifier, which calculates a distance between a current feature vector and corresponding learning feature vectors, where a closest calculated value is selected as the answer.

In some examples, machine learning algorithms may be used to determine the gate sensor, or the gate sensor may be determined using other techniques disclosed herein. In some examples, a compaction process such as the compaction process disclosed herein may be employed to eliminate non-useful data from the data set evaluated by the machine learning algorithm, which can reduce the processing required to interpret the data with the classifier.

Any one or more of the aspects and embodiments described herein may be conveniently implemented using one or more machines programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
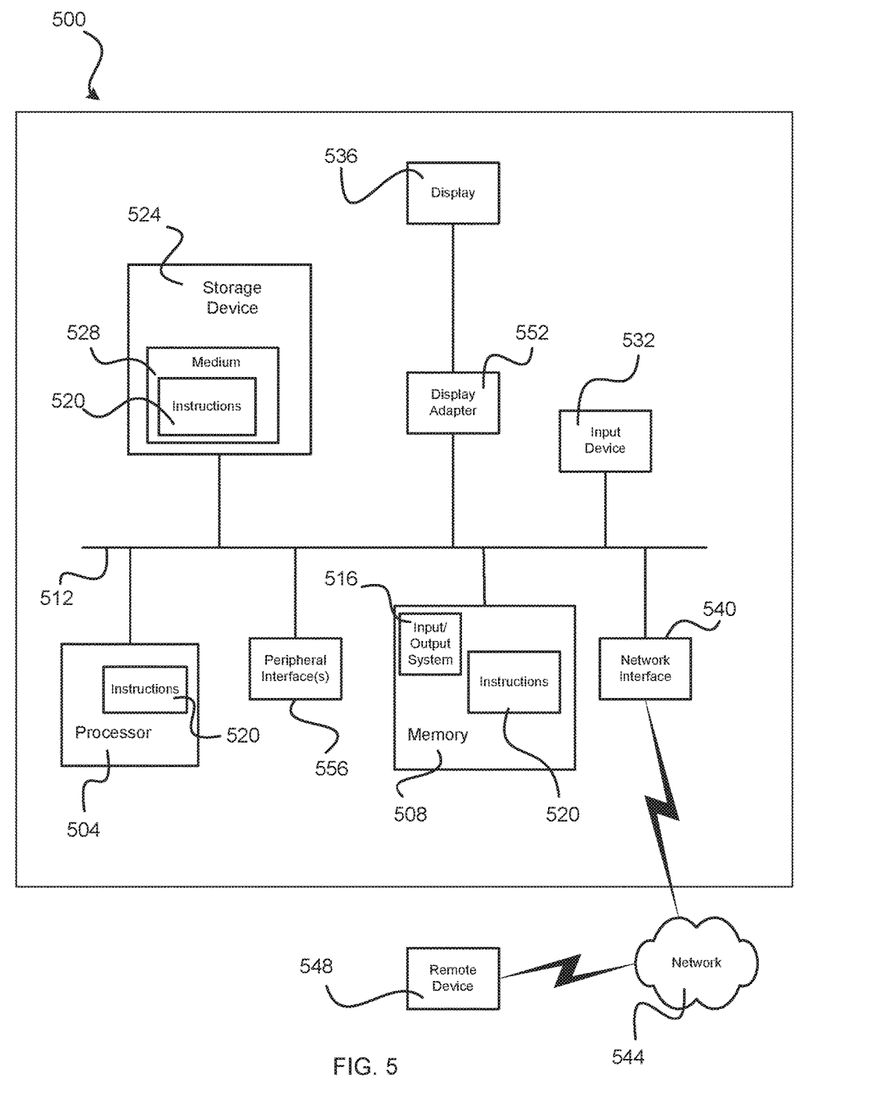
FIG. 5 is a diagrammatic representation of one embodiment of a computing device in accordance with various embodiments.

FIG. 5 shows a diagrammatic representation of one embodiment of a computing device in the exemplary form of a computer system 500 within which a set of instructions for causing a system, such as the device 100 of FIG. 1 and one or more building system components, to perform any one or more of the aspects and/or methodologies of the present disclosure. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Memory 508 may include various components (e.g., machine-readable media) including, but not limited to, a random access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the disclosure. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this disclosure. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present disclosure. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this disclosure.

Exemplary embodiments have been disclosed above and illustrated in the accompanying drawings. It will be understood by those skilled in the art that various changes, omissions and additions may be made to that which is specifically disclosed herein without departing from the spirit and scope of the present disclosure.

What is claimed is:

1. A method of determining an occupancy characteristic of a space with an array of motion sensors, each of the motion sensors having a field of view (FOV) and the space having a gate for entering and exiting the space, the array of motion sensors including a gate sensor, wherein the gate is in the FOV of the gate sensor, the method comprising:
   detecting, with the array, the presence of a person in the space when at least one of the motion sensors becomes active; and
   determining the space is empty when all of the motion sensors become inactive and the gate sensor was the last one of the motion sensors to be active.

2. The method of claim 1, further comprising:
   determining if a value of a timer meets or exceeds a threshold value; and
   determining the space is empty in response to determining that all of the motion sensors are inactive, the gate sensor was the last one of the motion sensors to be active, and the value of the timer meets or exceeds the threshold value.

3. The method of claim 1, further comprising, in response to determining the space is empty, sending an unoccupied signal to one or more building system components.

4. The method of claim 1, further comprising:
   determining whether one of the motion sensors adjacent the gate sensor was active prior to the gate sensor being active; and
   determining that a single person left the space in response to determining that one of the motion sensors adjacent the gate sensor was active prior to the gate sensor being active.

5. The method of claim 1, further comprising:
   determining whether a duration of time the gate sensor was active prior to all of the motion sensors becoming inactive is greater than a predetermined time duration; and
   determining that a single person left the space in response to determining that the duration of time the gate sensor was active prior to all of the motion sensors becoming inactive is greater than the predetermined time duration.

6. The method of claim 5, wherein the predetermined time duration is an amount of time to walk across a portion of the space encompassed by the gate sensor FOV.

7. The method of claim 1, further comprising:
   determining a first amount of time that the gate sensor was active prior to the space becoming empty;
   determining a second amount of time associated with one person walking across the gate sensor FOV; and
   determining, based on the first amount of time and a second amount of time, a number of people that have left the space.

8. A device, comprising
   a plurality of motion sensors, wherein at least one of the plurality of motion sensors is configured to be a gate sensor having a field of view that, when the device is installed in a space, includes a gate for entering and exiting the space; and
   a processor configured to:
      detect, with the plurality of motion sensors, the presence of a person when one of the motion sensors becomes active; and
      determine that a space monitored by the device is empty when all of the motion sensors become inactive and the gate sensor was the last one of the motion sensors to be active.

9. The device according to claim 8, wherein the processor is further configured to characterize sensor data from the plurality of sensors as state vectors having components, each of the components corresponding to one of the motion sensors.

10. The device according to claim 9, wherein the processor is further configured to identify the gate sensor from the plurality of sensors by analyzing the state vectors.

11. The device according to claim 9, wherein the processor is further configured to determine when a person has left the space by identifying a state vector in which only the gate sensor was active followed by a duration of time where no sensor was active.

* * * * *